Oct. 14, 1969  E. H. MUMFORD  3,472,639
GLASS MOLDING APPARATUS WITH MOLD ELEMENT ALIGNING MEANS
Filed Sept. 26, 1966  3 Sheets-Sheet 1
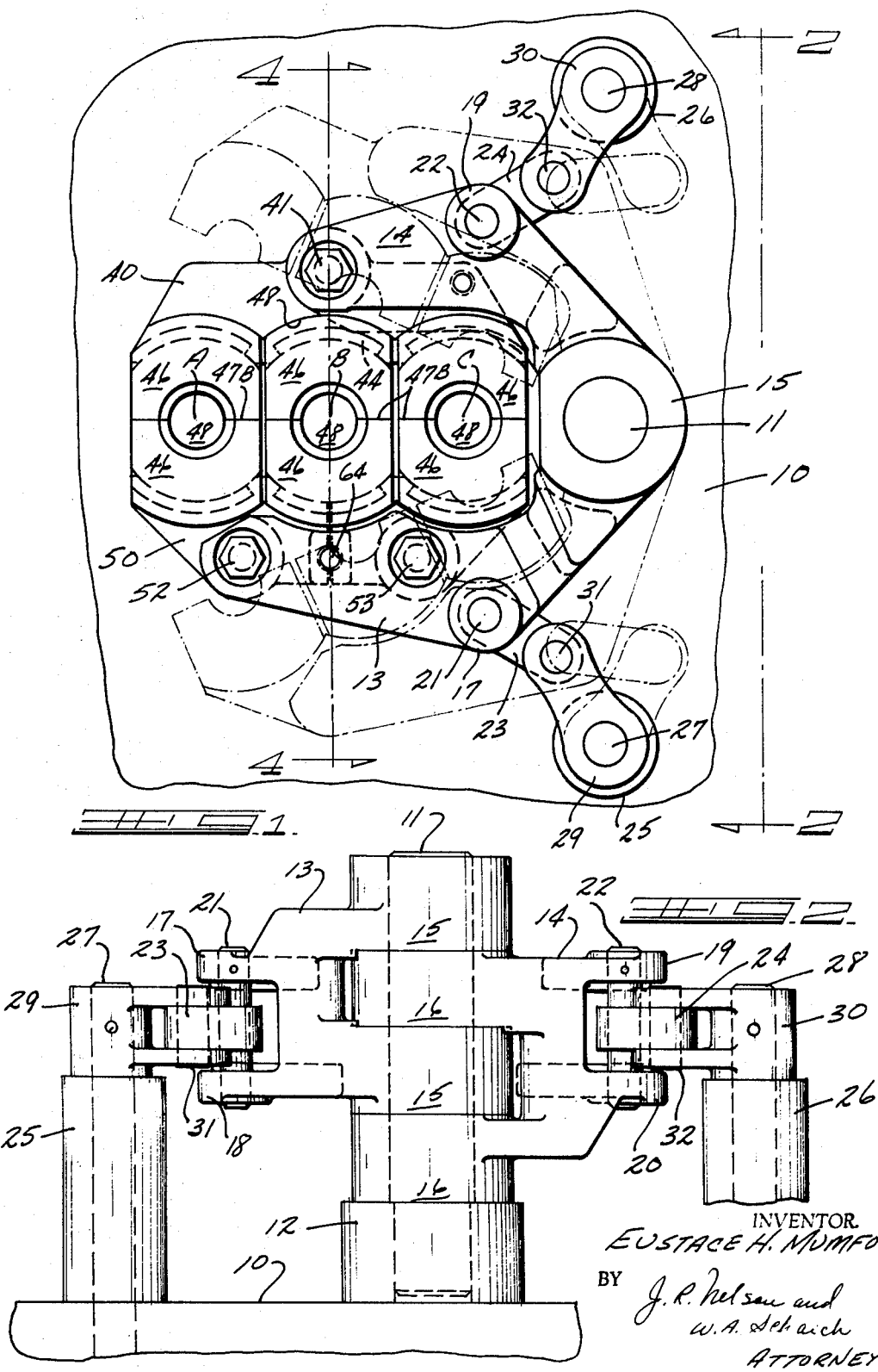
INVENTOR.
EUSTACE H. MUMFORD
BY J. R. Nelson and
W. A. Schaich
ATTORNEYS

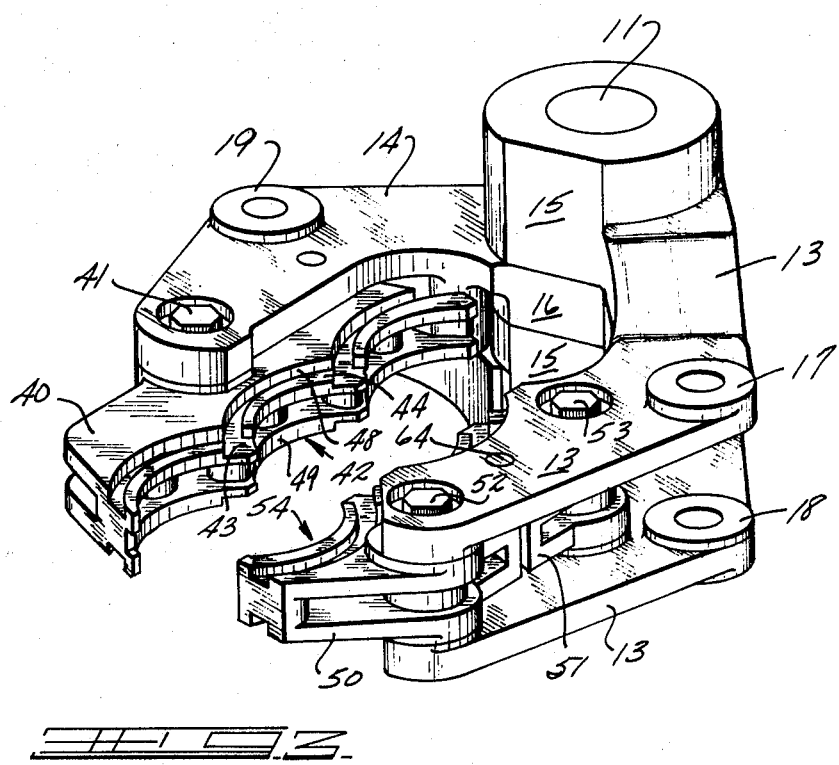

Oct. 14, 1969   E. H. MUMFORD   3,472,639
GLASS MOLDING APPARATUS WITH MOLD ELEMENT ALIGNING MEANS
Filed Sept. 26, 1966   3 Sheets-Sheet 3
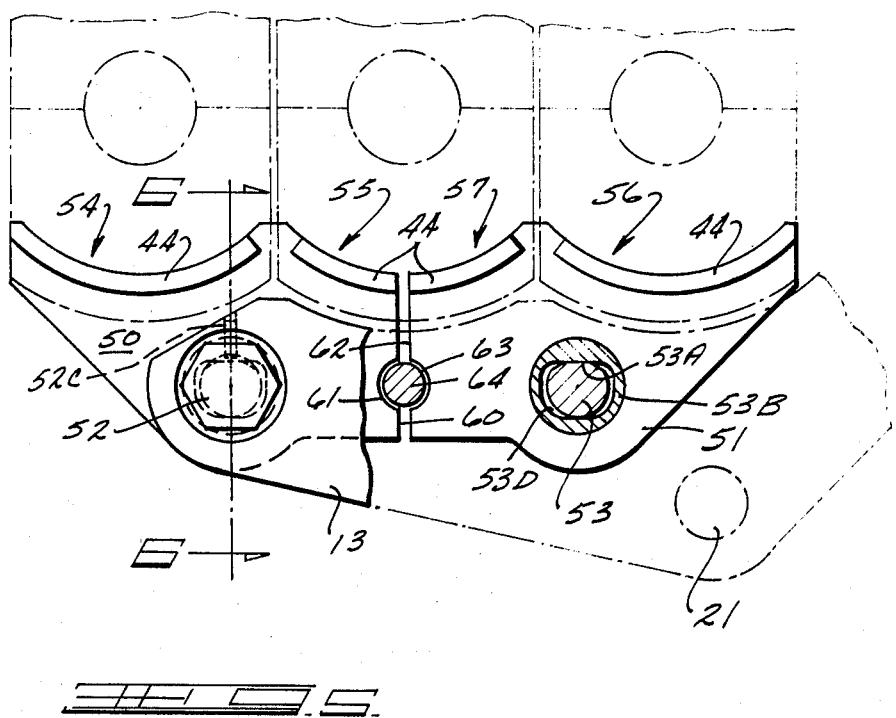
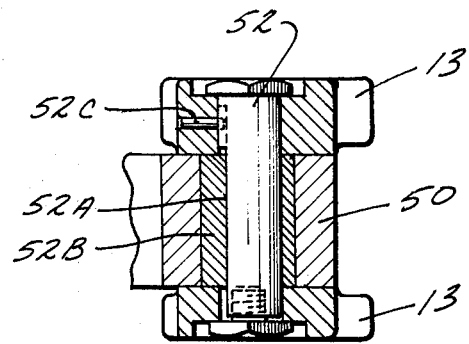
INVENTOR.
EUSTACE H. MUMFORD
BY
J. R. Nelson and
W. A. Schurch
ATTORNEYS

United States Patent Office 3,472,639
Patented Oct. 14, 1969

3,472,639
GLASS MOLDING APPARATUS WITH MOLD
ELEMENT ALIGNING MEANS
Eustace Harold Mumford, Ottawa Lake, Mich., assignor
to Owens-Illinois, Inc., a corporation of Ohio
Filed Sept. 26, 1966, Ser. No. 581,951
Int. Cl. C03b 11/16
U.S. Cl. 65—307                                    3 Claims

ABSTRACT OF THE DISCLOSURE

Apparatus for supporting three or more individual, split glass forming molds with supporting structure being capable of opening and closing movement. All of the individual mold halves at one side of a vertical plane passing through the split lines of the molds, are mounted on a unitary hanger or equalizer bar which in turn is pivotally mounted to the movable arm that applies the opening and closing forces. The other complementary mold halves are mounted on two segmented hangers or equalizer bars which in turn are individually, pivotally mounted to the other mold arm where each bar supports a full mold half and half of another mold half, in the case of a three mold arrangement. This pivot mounting of the segmented hangers or equalizer bars is such that limited lateral floating movement is permited.

---

The present invention relates to glass molding apparatus, and more particularly to glass molding apparatus utilizing three or more individual molding cavities defined by pairs of individual, complementary mold halves.

It is desirable to increase molding speeds of present glass forming machines, such as the I.S. machine (see Ingle 1,911,119) used in industry today. To achieve this objective, it is important to increase the cavity (article forming) capacity of the individual molding sections of the machine by providing increased numbers of molds on each mechanism for first molding a parison of glass at the preliminary blanking station; and, secondly, for blowing the parisons to final articles at the final blowing station. However, in increasing the number of molds handled by the mechanisms at each of these molding stations, the problem of equalizing the mold closing pressures on each of the molds arises.

It is an object of the present invention to provide a mold holder mechanism for increased numbers of molds, such as for triple molds, and yet provide for application of equalized closing pressure for the individual molds, that is, where there are three or more split molds used with a single mold holder at a molding station.

Another object of the invention is to provide such a mold holder mechanism, as mentioned, that will accommodate three or more split molds of different diameters where the diameter differential may be caused by wear, heat or original design or tolerances.

A further object of the invention is to provide such a mold holder mechanism, as mentioned, that is readily adaptable for use with present day mold operating mechanism, such as the scissor arms and actuating devices to operate the molds on the machine in providing for their cyclical opening and closing movement in molding operation.

The specific nature of this invention, as well as other objects and advantages thereof, will become apparent to those skilled in the art from the following detailed description taken in conjunction with the annexed sheets of drawings, on which, by way of preferred example only, are illustrated embodiments of this invention.

In the drawings:

FIG. 1 is a plan view of a blank mold mechanism embodying the present invention;

FIG. 2 is a rear elevational view of the mechanism of FIG. 1;

FIG. 3 is a three quarter front perspective view of a mold mounting mechanism embodying the present invention;

FIG. 4 is a sectional elevational view taken along line 4—4 on FIG. 1;

FIG. 5 is a fragmentary plan view, partly broken away, showing one of the equalizer bar arrangements on one of the mold arms of the mechanism of FIG. 1, the mold half sections being shown in phantom outline; and FIG. 6 is a vertical sectional elevation view taken along line 6—6 on FIG. 5.

Referring to the drawings:

On FIGS. 1 and 2 the forming machine frame, as casting 10, provides a support base for a vertical mold hinge shaft 11 held in boss 12 on the frame 10. A pair of mold arms 13 and 14 have at their one end a pair of vertically spaced, yoked bearing members 15 and 16 interlaced and journaled over shaft 11 such that they are pivotally mounted for scissors-type movement toward and away from each other. The bearing mountings of the mold arms are cast integrally with the mold arms such that the latter are arranged to move laterally and horizontally with respect to each other in the same horizontal plane.

Radially outwardly of the bearings and along the mold arm castings 13 and 14 are yoked, vertically spaced bosses 17–18 and 19–20, respectively, holding the pins 21 and 22. The pins 21 and 22 pivotally connect the links 23 and 24 to the mold arms 13 and 14.

A pair of hollow, vertical posts 25 and 26 are fastened to the frame 10 at opposite, laterally spaced positions on either side of the mold hinge shaft 11. The posts 25 and 26 provide bearings for the power rotated shafts 27 and 28. Power for operating the mold arms in their movement toward and away from each other is supplied by reciprocating cylinder motors (not shown) connected to drive rack gears in mesh with pinions keyed to the shafts 27 and 28. Rock arms 29 and 30 are keyed on the upper ends of the shafts 27 and 28, respectively, to be driven thereby. The rock arms have a yoke connection interlaced with the one end of the corresponding links 23 and 24 and connected thereto by the pins 31 and 32, respectively. The link 23 and rock arm 24, for example, comprise a toggle mechanism for swinging the one mold arm 13 on the hinge shaft 11.

Referring now to FIGS. 3 and 4, the mold arm 14 has a first equalizer bar 40 pivotally connected to it by the vertical pivot pin 41. The pin 41 is located through the corresponding bearing of the equalizer bar 40 such that it lies on the horizontal center line of a central mold carrying pocket 42 of the equalizer bar 40. The mold closing force applied through the pin 41 is centered on the three molds. The equalizer bar 40 is thus adapted to rock about its longitudinal center of the three mold carrying pockets defined by it. Each of the three illustrated mold carrying pockets include a horizontal web 43 with a vertical, arcuate rib 44 adapted to accommodate a corresponding arcuate hanger flange 45 on a mold half 46 of a mold 47. Each mold carrying pocket, such as 42, has vertically spaced apart, arcuate vertical facings 48 and 49, the facing 49 engaging the side wall of the mold half 46 in applying closing pressure to it along its axial length. The other two mold carrying pockets provided on either side of 42 of the equalizer bar 40 are similarly constructed, as above described.

Referring to FIGS. 3–6, the mold arm 13 is equipped with two equalizer bars 50 and 51 of a somewhat different structural arrangement. This combination might be thought of as a two-segmented equalizer bar having a vertical pivotal connection for each of the segments onto the mold arm 13 by the pins 52 and 53, respectively. The one equalizer bar 50 is constructed to define an outermost mold carrying pocket 54, constructed similarly to the above-described mold carrying pocket 42. Adjacent pocket 54 is a one-half pocket 55, which includes the arcuate rib on a horizontal web but of lesser arcuate extent, roughly one-half that in the pocket 54 or 42 structure. The equalizer bar 51 is mounted on its pivot pin 53 to be carried in an adjacent and slightly horizontally spaced relationship to the inner end of the bar 50. The mold carrying pocket 56 is formed at the innermost end of the bar 51 and a one-half pocket 57 is provided to cooperate with the one-half pocket of the equalizer bar 50. The pockets 55 and 57 together make up a mold carrying structure for mounting a mold half thereon, such as the mold half 46 illustrated and described above in conjunction with FIG. 4. The vertical centers of the three molds (mold cavities 47) are indicated on FIG. 1 at points A, B and C. The location of the rock pins 52 and 53 for the equalizer bars 50 and 51 is important, as will be presently described. In FIG. 1, assuming a line longitudinally of the mold parting lines 47B and through the mold centers A, B, and C, the pin 52 is located a distance along this line that is one-third of the distance from mold center A to mold center B or two-thirds of the distance from mold center B to mold center A. Similarly, the rock pin 53 is located one-third of the distance from mold center C to mold center B or two-thirds of the distance from mold center B to mold center C. Accordingly, force applied through the rock pins 52 and 53, respectively, to close the molds will be equally divided between the three. More specifically, the force applied through pin 52 will be applied as two-thirds of the total force to closing mold A and one-third toward closing mold B, and the force applied through pin 53 will be applied as two-thirds thereof toward closing mold C and one-third toward closing mold B. Thusly, the closing forces are equalized.

The inner facing 60 of the equalizer bar 50 has an arcuate notch 61 and the outer end facing 62 of the equalizer bar 51 has a complementary arcuate notch 63, the two notches 61–63 cooperating with a vertical keeper pin 64 held in the mold arm 13 to limit the horizontal rocking movement of the equalizer bars 50 and 51.

In operation at the blank molding station of the machine, the mold halves 46 are placed in the mold carrying pockets of the equalizer bars 40, 50 and 51 so that three sets of split molds are mounted on the mold arms 13 and 14 (see FIG. 1). The mold arms are moved toward each other such that the mold halves 46, at their lower end, close about a neck mold 70, as shown on FIG. 4, and the complementary mold halves meet at their mold seams defined at the parting line 47B. Thusly, each of the three molds 47 define a molding cavity 47A for forming a hollow glass article, such as a hollow glass parison. The neck mold is already closed on a thimble or guide ring and plunger assembly 71 (not shown in detail, but well-known in connection with glass forming machines for forming hollow articles, such as containers and the like). In applying the closing force imparted through the mold arms, the equalizer bar 40, about its central pivot pin will pilot on, and close securely around the lower neck mold. The other two equalizer bars 50 and 51, in closing their molds, will pivot about the rock pins 52 and 53, respectively, and equalize the opposite closing force of each of the molds in the manner described earlier for closing the mating mold halves against each other and about their corresponding neck molds. The closed position of the molds is shown in solid outline on FIG. 1. This closing force being equalized, if the three molds are of different diameters, such as may be caused by wear, differential heat, or original tolerance, the force applied by the system of the present invention permits the arms to apply closing pressures to the three individual molds that are equalized. The mold closing force being equalized, faults arising from one or more of the molds opening slightly or not being properly matched with their neck molds are avoided.

Another important feature of the invention resides in the precise structure for mounting the equalizer bar segments 50 and 51 allowing them some horizontal floating movement. This assures that the arcuate pressure applying faces 49 of the mold carrying pockets will fit properly on the arcuate outer wall of the mold halves they carry. As the molds are closed, they have equal pressure applied. As shown on FIGS. 5 and 6, each of the rock pins 52 and 53 are mounted in the mold arm 13 in a similar manner. The pins 52 and 53 are secured in nonrotatable position on the mold arm by a pin or key such as 52C. Intermediate the length of the rock pins is a milled flat face (see 52A and 53A). The pins 52 and 53 are fitted in an elongated slot, such as 53D on FIG. 5, of the bushings 52B or 53B. Each bushing is journaled in the respective aperture of the equalizer bar segment such that each of the bar segments is rotatable on its bushing, either 52B or 53B. The equalizer bar segments 50 and 51 are thus allowed limited horizontal float (for example, see bar 51 on FIG. 5) by the sliding movement of the flat face 53A on the adjacent flat surface of the elongated slot 53D in the bushing 53B. This equalizer bar segment 51 is also allowed rotational movement about the bushing 53B limited by the keeper pin 64 fitted loosely in slot 63.

The function of the keeper pin 64 arises principally on opening and closing of the molds. The molds are shown in open position in phantom outline on FIG. 1. As the arms 13 and 14 are moved away from each other by the reciprocal motive means described above, rotation of the equalizer bars 50 and 51 is limited. The keeper pin 64 also limits undue rotation of the equalizer bars on closing the molds.

It will be appreciated by those skilled in the art that the above-described apparatus is not only suited for the blank molding station of the glass machine, but, with appropriate structural modifications of a minor nature, the principles of the mechanism are equally applicable to the operation of triple gob blow molds, wherein the parisons of the blank mold station are blown to the shape of the final article. The invention is, therefore, not limited to the illustrated form of mold or process.

Moreover, the principles of the invention are applicable to apparatus utilizing more than three molds on a pair of mold arms, preferably of an odd integer, such as five or seven, etc. The structure of the invention is accordingly adapted for molding mechanisms using three or more individual split molds.

I claim:

1. In a glass forming apparatus comprising a pair of mold arms, means attached to said mold arms mounting them for movement toward and away from each other, means connected to one of said mold arms and defining at least three mold carrying pockets, a two-segmented mold equalizer means, each segment thereof defining at least one and one-half mold carrying pockets, means pivotally connecting said equalizer segments to the other of said mold arms in a cooperating relationship to provide at least three adjacent mold carrying pockets, at least three pairs of complementary mold halves respectively mounted in the mold pockets defined by said means on the one mold arm and said equalizer means, each pair of complementary mold halves being in juxtaposed closed position upon movement of said mold arms toward each other to define a glass molding cavity, and means connected to said pair of mold arms for moving them toward and away from each other, the equalizer means, upon closing movement of the molds by said arms, applying equalized closing pressures to each of the said pairs of complementary mold halves.

2. The apparatus defined in claim 1 wherein the two segmented equalizer means comprises first and second equalizer bars each defining at least one and one-half mold carrying pockets, each of said bars being mounted on rocking means connected to said other mold arm and longitudinally spaced thereon for applying equal closing forces to the mold halves carried thereon in engagement with the complementary mold halves on the said one mold arm.

3. The apparatus defined in claim 2, wherein the means connected to the one of said mold arms defining at least three mold carrying pockets comprises an equalizer bar, a rock pin pivotally connecting the equalizer bar on said one mold arm, the rock pin being longitudinally, centrally located with respect to the mold carrying pockets of said equalizer bar.

References Cited

UNITED STATES PATENTS

| 2,018,785 | 10/1935 | Harrison | 65—360 |
| 3,278,290 | 10/1966 | Rowe | 65—361 |

S. LEON BASHORE, Primary Examiner

FRANK W. MIGA, Assistant Examiner

U.S. Cl. X.R.

65—323, 357, 359, 360, 361